United States Patent [19]

Plyler

[11] Patent Number: 4,626,620

[45] Date of Patent: Dec. 2, 1986

[54] WIRE BUNDLE AND GROMMET ASSEMBLY

[75] Inventor: Robert G. Plyler, Vienna, Ohio

[73] Assignee: General Motors Corporation, Detroit, Mich.

[21] Appl. No.: 804,618

[22] Filed: Dec. 5, 1985

[51] Int. Cl.$^4$ .................. H02G 3/22; H01B 17/30
[52] U.S. Cl. .................. 174/153 G; 248/56; 285/162
[58] Field of Search ............ 174/153 G, 152 G, 65 G; 16/2; 248/56; 277/178; 285/159, 162

[56] References Cited

U.S. PATENT DOCUMENTS

| | | | |
|---|---|---|---|
| 3,076,668 | 2/1963 | Famely | 248/56 X |
| 4,289,924 | 9/1981 | Pearce, Jr. et al. | 174/152 G |
| 4,407,042 | 10/1983 | Schramme et al. | 174/153 G X |

FOREIGN PATENT DOCUMENTS 35345  6/1966  Finland ............ 174/153 G

Primary Examiner—Laramie E. Askin
Attorney, Agent, or Firm—Patrick M. Griffin

[57] ABSTRACT

A wire bundle and grommet assembly includes a grommet body with an extension and a retention sleeve that slideably fits over the grommet body extension. Respective stop flanges are spaced from one another. The retention sleeve also includes a one-way ratchet means, and flexible retention fingers engageable with cam ramps on the grommet body extension. When the wire bundle is pulled through the aperture, the grommet body extension and retention sleeve move as one through the aperture, until the retention sleeve stop flange anchors on the bulkhead panel. Thereafter, the grommet body extension slides through the anchored retention sleeve, and the cam ramps flex the retention fingers outboard, past the perimeter of the aperture, and into engagement with one surface of the bulkhead panel. The grommet body stop flange concurrently engages the other surface of the bulkhead panel. The ratchet means keeps the various parts in that position, and the assembly is thereby attached to the bulkhead panel. A compressible gasket may also be provided on the grommet body stop flange to provide a seal.

3 Claims, 5 Drawing Figures

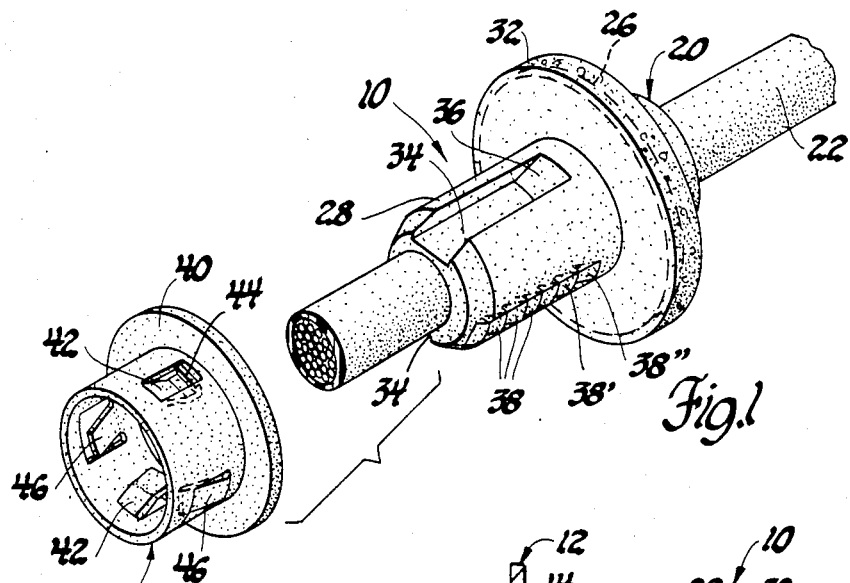
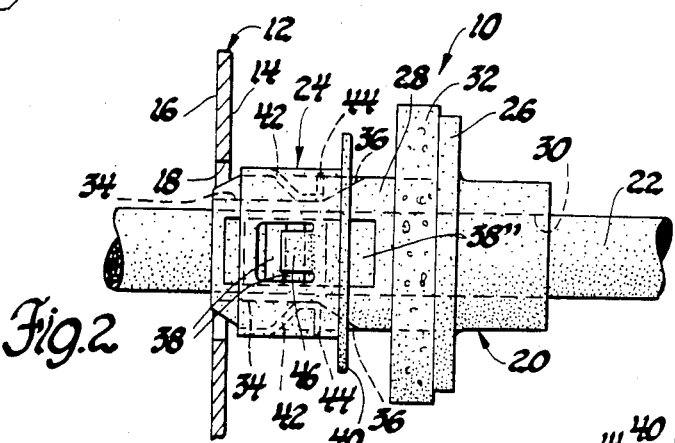
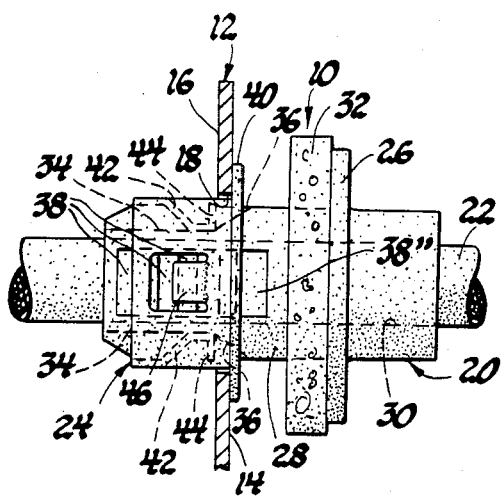
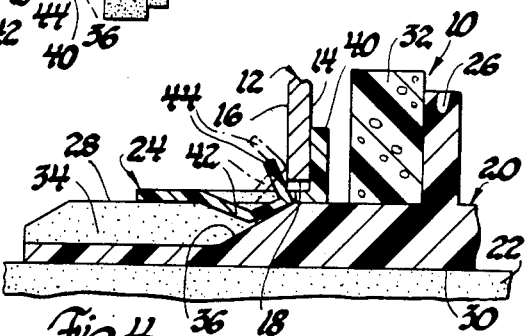
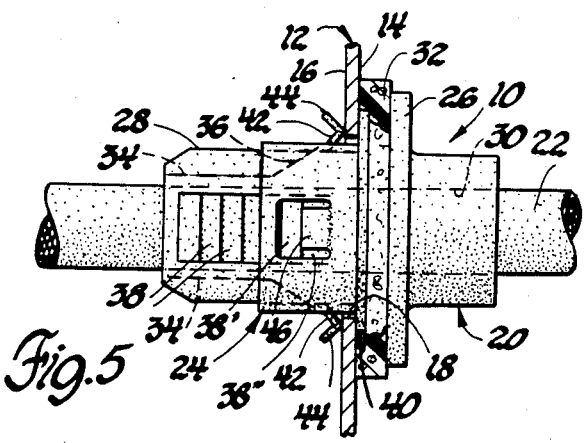

WIRE BUNDLE AND GROMMET ASSEMBLY

This invention relates to grommet assemblies in general, and specifically to a combined wire bundle and grommet assembly that is attachable to a panel having opposed surfaces so as to pass the wire bundle through an aperture in the panel.

BACKGROUND OF THE INVENTION

In the automotive industry, wire bundles must often be passed through apertures in a bulkhead panel of a vehicle as it is being wired. A grommet assembly is desirable to protect the bundle from the sharp edges of the aperture. As electronic components have increased in number and complexity, it has become necessary to protect and support much larger and heavier wire bundles. Consequently, the trend is toward grommet assemblies, often known as hardshell grommet assemblies, that are larger and capable of handling and accurately locating the larger wire bundles. These hardshell grommet assemblies generally include a grommet body with a passage through which the wire bundle extends. Often, these hardshell grommet assemblies also provide for injecting a sealant material into the passage around the wire bundle. This sealant, sometimes in conjunction with wire clips inside the passage, holds the wire bundle fast with respect to the grommet body. Some means is necessary to attach the grommet body to the bulkhead panel overlying the aperture as the vehicle is being wired. Various means for doing so are disclosed in patents assigned to the assignee of the present invention. U.S. Pat. No. 4,289,924 to Pearce et al shows a hardshell grommet assembly 10 that is attached to a bulkhead panel 14 overlying an aperture 12 by bolts or other fasteners that pass through holes in the bulkhead panel 14. A grommet assembly that requires no fasteners passing through the bulkhead panel is disclosed in U.S. Pat. No. 4,407,042 to Schramme et al. There, a grommet assembly 10 has a shank 38 that is inserted through the bulkhead panel aperture. Then, a U-shaped retainer 22 is pushed in from the side into tapered slots 54 in the shank 38 to attach and retain the grommet assembly 10. Both of these attachment methods work well, and have been extensively used. However, it is always desirable to simplify or eliminate assembly steps, if possible.

SUMMARY OF THE INVENTION

The subject invention provides a combined wire bundle and grommet assembly that works in combination with the wire bundle to provide for a one step attachment to a bulkhead panel having opposed surfaces with a circular aperture therethrough.

The invention includes a grommet body having a passage through which a wire bundle extends and within which the wire bundle is held fast by an injected sealant. The grommet body also has a stop portion in the form of a circular flange with a diameter larger than the aperture. The stop flange is backed by an annular compressible gasket. A cylindrical extension of the grommet body has a diameter smaller than the aperture so that it can be fitted therethrough. The grommet body extension includes a cam member, which is a ramp molded into the grommet body extension and sloped toward the stop flange. The grommet body extension also has a series of ratchet teeth molded into it.

A cylindrical retention sleeve is slideably fitted over the grommet body extension and cam ramp. The retention sleeve also has a diameter smaller than the aperture, but for a stop portion, also in the form of a circular flange with a diameter larger than the aperture. The grommet body extension and retention sleeve stop flanges are spaced from one another prior to attaching the assembly to the bulkhead panel. The retention sleeve has a retention member, which is a flexible finger that normally lies substantially inboard of the retention sleeve. The grommet body extension, with the retention sleeve over it, can therefore be fitted together through the aperture. The retention sleeve also includes a resilient tang that is engageable with the ratchet teeth on the grommet body extension to provide a ratchet means.

To attach the assembly of the invention, the wire bundle is pulled through the aperture. Since the wire bundle is held fast with respect to the grommet body, the grommet body extension and retention sleeve initially move as one through the aperture. This continues until the retention sleeve stop flange engages one of the opposed bulkhead panel surfaces, thereby anchoring the retention sleeve with respect to the bulkhead panel. Continued pulling on the wire bundle then causes the grommet body extension to slide relative to and through the anchored retention sleeve in an operative direction that moves the spaced stop flanges toward one another. Relative sliding is allowed only in the operative direction, because of the engagement of the flexible tangs with the ratchet teeth. As the grommet body extension slides through the retention sleeve, the cam ramp engages the retention finger and flexes it sufficiently outboard of the retention sleeve to move past the perimeter of the aperture and into engagement with the other bulkhead panel surface. The relative sliding continues until the gasket is engaged by grommet body stop flange and compressed against the one bulkhead panel surface, thereby providing a seal between the grommet body and the aperture. The engagement of the retention fingers and the grommet body stop flange with their respective bulkhead panel surfaces attaches the assembly of the invention to the bulkhead panel, although the grommet body stop flange engages the bulkhead panel indirectly, through the intermediate compressed gasket. The ratchet means also acts as a latch means to prevent the retention sleeve and the grommet body extension from sliding relative to each other opposite to the operative direction. This maintains the retention fingers and the grommet body stop flange in engagement with their respective bulkhead panel surfaces, and aids in the attachment.

It is, therefore, an object of the invention to provide a combined wire bundle and grommet assembly attachable to a panel having opposed surfaces so as to pass the wire bundle through an aperture in the panel, a combined assembly that includes a grommet body having a passage through which a wire bundle extends and within which the wire bundle is held fast with respect to the grommet body, the grommet body also having a stop portion that is sized larger than the aperture and an extension that is sized smaller than the aperture, with a cam member on the extension, the combined assembly also having a retention sleeve that slideably fits over the grommet body extension and cam member, the retention sleeve being sized smaller than the aperture but for a stop portion that is sized larger than the aperture and spaced from the grommet body stop portion, the retention sleeve also having a retention member that normally lies substantially inboard of the retention sleeve so as to fit through the aperture, but which is movable outboard of the retention sleeve by the cam member when the grommet body extension slides relative to the retention sleeve in an operative direction that moves the retention sleeve and grommet body stop portions toward one another, so that the wire bundle may be pulled through the aperture, thereby pulling the grommet body extension and retention sleeve through the aperture until the retention sleeve stop portion engages one of the opposed panel surfaces to anchor the retention sleeve with respect to the panel, whereupon continued pulling on the wire bundle will slide the grommet body extension relative to the anchored retention sleeve in the operative direction to engage the cam member with the retention member and thereby move the retention member sufficiently outboard of the retention sleeve to move past the perimeter of the aperture and into engagement with the other of the panel surfaces, the relative sliding continuing until the grommet body stop portion also engages the one panel surface, the engagement of the grommet body stop portion and retention member with their respective opposed panel surfaces thereby attaching the assembly to the panel.

It is another object of the invention to provide a combined wire bundle and grommet assembly of the type described in which there is also a latch means operable between the retention sleeve and the grommet body to prevent the retention sleeve and grommet body extension from sliding relative to each other opposite to the operative direction when the grommet body stop portion engages the one panel surface, thereby maintaining the retention member and the grommet body stop portion in engagement with their respective panel surfaces to aid in the attachment.

It is yet another object of the invention to provide a combined wire bundle and grommet assembly of the type described in which the grommet body extension includes a cam ramp, and in which the retention sleeve includes a flexible retention member that is flexible sufficiently outboard of the retention sleeve by the cam ramp as the grommet body extension and the anchored retention sleeve slide relative to one another in the operative direction to move the retention member past the perimeter of the aperture and into engagement with the panel surface opposite to the panel surface engaged by the retention sleeve stop portion, and which also includes a ratchet means engageable between the retention sleeve and the grommet body to allow the retention sleeve to slide relative to the grommet body extension in only the operative direction as the cam ramp flexes the retention member outboard of the retention sleeve, the ratchet means also acting as a latch means to maintain the grommet body stop portion and retention member in engagement with their respective opposed panel surfaces to thereby attach the assembly to the panel.

DESCRIPTION OF THE PREFERRED EMBODIMENT

These and other objects and features of the invention will appear from the following written description and drawings, in which:

FIG. 1 is a perspective view of the preferred embodiment of the invention showing the retention sleeve removed from the grommet body;

FIG. 2 is a side view of the preferred embodiment with an apertured bulkhead panel shown in cross section, and showing the beginning of the attachment process;

FIG. 3 is a view similar to FIG. 2 showing a later stage of the attachment process when the retention sleeve has been anchored;

FIG. 4 is an enlarged view of a portion of the preferred embodiment in cross section showing a still later stage in the attachment process, when the retention member is moving past the perimeter of the aperture;

FIG. 5 is a view showing the preferred embodiment finally attached.

Referring first to FIGS. 1 and 2, the preferred embodiment of the invention is designated generally at 10. The invention 10 is attachable to a panel, such as a bulkhead panel 12, which has opposed surfaces 14 and 16 with a circular aperture 18 therethrough. The invention 10 includes a grommet body designated generally at 20, a wire bundle 22, and a retention sleeve designated generally at 24. These structures cooperate to form a combined assembly that is attachable to bulkhead panel 12 in a simple and advantageous manner. These structures will be described in detail below, followed by a detailed description of the attachment process.

Still referring to FIGS. 1 and 2, the grommet body 20 is molded of a suitable plastic with a circular stop flange 26 and a cylindrical extension 28 running from the stop flange 26. The grommet body extension 28 has a diameter smaller than the aperture 18, so that it can be fitted therethrough, while the stop flange 26 has a diameter larger than the aperture 18. A central passage 30, shown by dotted lines in FIG. 2, runs all the way through grommet body 20, generally coaxial with the grommet body extension 28, and the wire bundle 22 extends therethrough. Grommet body 20 is the hardshell injectable type, and the wire bundle 22 is held fast with respect to it by a suitable sealant injected into passage 30. That feature of the wire bundle 22 is used to advantage in the invention. Wire bundle 22, of course, need not necessarily be a plurality of small wires, but may be a single larger wire or sheathed cable, as long as it is held fast. The stop flange 26 is backed by an annular compressible gasket 32, for a purpose further described below. However, it will be understood at this point that the stop flange 26 is engageable with bulkhead panel surface 14, indirectly so, through the intermediate gasket 32. The grommet body extension 28 also includes a pair of diametrically opposed molded grooves 34 inset into its surface that run generally parallel to its axis. Each groove 34 ends in a cam ramp 36 that slopes toward the stop flange 26. The grommet body extension 28 also has two diametrically opposed series of ratchet teeth 38 molded into its surface. The ratchet teeth 38 run substantially parallel to the grooves 34, and the last two are distinguished by the numbers 38' and 38", to aid in later description.

Referring still to FIGS. 1 and 2, the retention sleeve 24 is a cylindrical sleeve molded of plastic or other suitable material. Retention sleeve 24 has an inner diameter that is close to, but larger than, the outer diameter of grommet body extension 28, and therefore will fit slideably over it. The outer diameter of retention sleeve 24 is everywhere smaller than, but close to, the diameter of aperture 18, but for a circular stop flange 40 that has a larger diameter. Therefore, the grommet body extension 28, with the retention sleeve 24 over it, can fit through aperture 18, as shown in FIG. 3. The retention sleeve 24 has a pair of flexible retention fingers 42 that normally lie inboard, each within a respective groove 34, so as to fit through the aperture 18. Since the retention fingers 42 are flexible, they could still fit through aperture 18 even if they extended outboard of retention sleeve 24 by a small distance. The free ends 44 of the retention fingers 42 extend radially outwardly relative to retention sleeve 24. The retention sleeve 24 also includes a pair of resilient tangs 46 that extend inboard thereof, each of which engages a respective series of the ratchet teeth 38 when retention sleeve 24 is fitted over the grommet body extension 28. The ratchet teeth 38 and the resilient tangs 46 cooperate to provide a one-way ratchet means that operates during the attachment process, described next.

Referring next to FIGS. 2 and 3, prior to attachment, the retention sleeve 24 is fitted over the grommet body extension 28 and pushed to the relative position shown in FIG. 2, where it is retained by the engaged resilient tangs 46 and ratchet teeth 38. In FIG. 2, the retention fingers 42 are not yet engaged by their respective cam ramps 36, and the stop flanges 26 and 40 are spaced from one another with the gasket 32 located therebetween. To attach the assembly of the invention 10, the wire bundle 22 is pulled through the aperture 18 from right to left. This pulling would likely be done manually, though not necessarily, and constitutes the single step of the attachment process. The operation of the various structures described above occurs essentially automatically, activated by the pulling on wire bundle 22. Since the wire bundle 22 is held fast with respect to the grommet body 20, the grommet body extension 28 and retention sleeve 24 initially move as one through the aperture 18. This continues until, as seen in FIG. 3, the retention sleeve stop flange 40 engages bulkhead panel surface 14. This anchors the retention sleeve 24 with respect to the bulkhead panel 12.

Referring now to FIGS. 3 and 4, continued pulling on the wire bundle 22 now causes the grommet body extension 28 to slide relative to, and through, the anchored retention sleeve 24. This relative sliding occurs in what may be defined as an operative direction, the direction that moves the spaced stop flanges 40 and 26 toward one another. It will be understood that the one-way ratchet means provided by the resilient tangs 46 and ratchet teeth 38 assures that only that direction of relative sliding can occur. As the grommet body extension 28 slides through the retention sleeve 24, the cam ramps 36 begin to engage their respective retention fingers 42 and flex them outboard of retention sleeve 24, as shown in solid lines in FIG. 4. The cam ramps 36 flex the retention fingers 42 sufficiently outboard to move past the perimeter of the aperture 18 and, finally, into engagement with the bulkhead panel surface 16, as seen in dotted lines in FIG. 4, and also in solid lines in FIG. 5. The close clearance between retention sleeve 24 and the aperture 18 helps assure that the retention fingers 42 move past the perimeter of aperture 18. The resilience and flexibility of the retention fingers 42 and the shape and orientation of the retention finger ends 44 help assure that the retention fingers 42 will not hang up on the edge of the aperture 18, even if the retention finger ends 44 should scrape across the edge of aperture 18 as the retention fingers 42 are flexed outboard.

Referring finally to FIGS. 4 and 5, concurrently with the last flexing motion of the retention fingers 42, the gasket 32 is engaged by grommet body stop flange 26 and compressed against the bulkhead panel surface 14. FIG. 4 shows gasket 32 about to be compressed. As gasket 32 fully compresses, a sharp increase in the resistance to pulling on wire bundle 22 will be immediately apparent, and the pulling will be stopped. The engagement of the retention fingers 42 and the grommet body stop flange 26 with their respective bulkhead panel surfaces 16 and 14 sandwiches the bulkhead panel 12, and attaches the assembly 10 of the invention to the bulkhead panel 12. This is true even though the engagement of the grommet body stop flange 26 is indirect, through the gasket 32. As the retention fingers 42 move to their final position and the gasket 32 fully compresses, the resilient tangs 46 also concurrently snap over the next to last ratchet teeth 38', as shown in FIG. 5. The one-way ratchet means referred to above thereby acts as a latch means to prevent the retention sleeve 24 and the grommet body extension 28 from sliding relative to each other opposite to the operative direction. Therefore, the flexible retention fingers 42 are maintained in their FIG. 5 position, engaged with bulkhead panel surface 16, and the cam ramps 36 prevent the retention fingers 42 from flexing back inboard. This gives solidity to and aids in the attachment of the assembly 10. Gasket 32, besides providing a seal, also provides for some resilience in the attachment. Should a force pull on wire bundle 22 in the FIG. 5 position, gasket 32 can be compressed an additional amount, thereby moving the resilient tangs 46 part way up the last ratchet teeth 38", and moving the retention finger ends ends 44 slightly away from bulkhead panel surface 16. Release of the force would allow the gasket 32 to expand back to its FIG. 5 thickness, moving the resilient tangs 46 and retention finger ends 44 back to their FIG. 5 positions.

Variations of the preferred embodiment may be made within the spirit of the invention. The retention fingers 42 could have enough inherent resistance to flexing back, or the grommet body extension 28 could have enough inherent resistance to sliding opposite to the operative direction, that a specific latch means would not be necessary. Furthermore, only the ratchet teeth 38' last snapped over by the resilient tangs 46 are absolutely necessary to act as a latch means. However, a series of ratchet teeth 38 is useful in that it assures relative sliding of retention sleeve 24 and grommet body extension 28 in only the operative direction throughout the attachment process. The one-way ratchet means makes the attachment process easier, and also helps to hold the retention sleeve 24 to the grommet body extension 28 prior to the attachment process. Cam members and retention members other than the cam ramps 36 and the retention fingers 42 could be used, although those provide for a relatively simple assembly. Gasket 32 is not absolutely necessary to the attachment, although it is advantageous to provide a seal and the resilient attachment described above. Therefore, it will be understood that the invention is not intended to be limited to that exact embodiment disclosed.

The embodiments of the invention in which an exclusive property or privilege is claimed are defined as follows:

1. A combined wire bundle and grommet assembly attachable to a panel having opposed surfaces so as to pass said wire bundle through an aperture in said panel, comprising, a grommet body having a passage through which a wire bundle extends and within which said wire bundle is held fast with respect to said grommet body, said grommet body further including a stop portion that is sized larger than said aperture and an extension that is sized smaller than said aperture, a cam member on said grommet body extension,
a retention sleeve slideably fitted over said grommet body extension and cam member, said retention sleeve being sized smaller than said aperture but for a stop portion sized larger than said aperture and spaced from said grommet body stop portion,
a retention member on said retention sleeve that normally lies substantially inboard of said retention sleeve so as to fit through said aperture, but which is movable outboard of said retention sleeve by said cam member when said grommet body extension slides relative to said retention sleeve in an operative direction so as to move said retention sleeve and grommet body stop portions toward one another, whereby, said wire bundle may be pulled through said aperture, thereby pulling said grommet body extension and retention sleeve through said aperture until said retention sleeve stop portion engages one of said opposed panel surfaces, thereby anchoring said retention sleeve with respect to said panel, continued pulling on said wire bundle then serving to slide said grommet body extension relative to said anchored retention sleeve in said operative direction with said relative sliding serving to engage said cam member with said retention member to thereby move said retention member sufficiently outboard of said retention sleeve to move past the perimeter of said aperture and into engagement with the other of said panel surfaces, said relative sliding continuing until said grommet body stop portion also engages said one panel surface, whereby, the engagement of said retention member and said grommet body stop flange with their respective opposed panel surfaces attaches said assembly to said panel.

2. A combined wire bundle and grommet assembly attachable to a panel having opposed surfaces so as to pass said wire bundle through an aperture in said panel, comprising,
a grommet body having a passage through which a wire bundle extends and within which said wire bundle is held fast with respect to said grommet body, said grommet body further including a stop portion that is sized larger than said aperture and an extension that is sized smaller than said aperture,
a cam member on said grommet body extension,
a retention sleeve slideably fitted over said grommet body extension and cam member, said retention sleeve being sized smaller than said aperture but for a stop portion sized larger than said aperture and spaced from said grommet body stop portion,
a retention member on said retention sleeve that normally lies substantially inboard of said retention sleeve so as to fit through said aperture, but which is movable outboard of said retention sleeve by said cam member when said grommet body extension slides relative to said retention sleeve in an operative direction so as to move said retention sleeve and grommet body stop portions toward one another, whereby, said wire bundle may be pulled through said aperture, thereby pulling said grommet body extension and retention sleeve through said aperture until said retention sleeve stop portion engages one of said opposed panel surfaces, thereby anchoring said retention sleeve with respect to said panel, continued pulling on said wire bundle then serving to slide said grommet body extension relative to said anchored retention sleeve in said operative direction with said relative sliding serving to engage said cam member with said retention member to thereby move said retention member sufficiently outboard of said retention sleeve to move past the perimeter of said aperture and into engagement with the other of said panel surfaces, said relative sliding continuing until said grommet body stop portion also engages said one panel surface, whereby, the engagement of said retention member and said grommet body stop flange with their respective opposed panel surfaces attaches said assembly to said panel, and,
latch means operable between said retention sleeve and said grommet body to prevent said retention sleeve and grommet body extension from sliding relative to each other opposite to said operative direction when said grommet body stop portion engages said one panel surface, whereby said grommet body stop portion and retention member are maintained in engagement with their respective opposed panel surfaces by said latch means.

3. A combined wire bundle and grommet assembly attachable to a panel having opposed surfaces so as to pass said wire bundle through an aperture in said panel, comprising,
a grommet body having a passage through which a wire bundle extends and within which said wire bundle is held fast with respect to said grommet body, said grommet body further including a stop portion that is sized larger than said aperture and an extension that is sized smaller than said aperture,
a cam ramp formed on said grommet body extension,
a retention sleeve slideably fitted over said grommet body extension and cam member, said retention sleeve being sized smaller than said aperture but for a stop portion sized larger than said aperture and spaced from said grommet body stop portion,
a flexible retention member on said retention sleeve that normally lies substantially inboard of said retention sleeve so as to fit through said aperture, but which is flexible outboard of said retention sleeve by said cam ramp when said grommet body extension slides relative to said retention sleeve in an operative direction so as to move said retention sleeve and grommet body stop portions toward one another, whereby, said wire bundle may be pulled through said aperture, thereby pulling said grommet body extension and retention sleeve through said aperture until said retention sleeve stop portion engages one of said opposed panel surfaces, thereby anchoring said retention sleeve with respect to said panel, continued pulling on said wire bundle then serving to slide said grommet body extension relative to said anchored retention sleeve in said operative direction with said relative sliding serving to engage said cam ramp with said retention member to thereby flex said retention member sufficiently outboard of said retention sleeve to move past the perimeter of said aperture and into engagement with the other of said panel surfaces, said relative sliding continuing until said grommet body stop portion also engages said one panel surface, whereby, the engagement of said retention member and said grommet body stop flange with their respective opposed panel surfaces attaches said assembly to said panel, and,
ratchet means engageable between said retention sleeve and said grommet body to allow said retention sleeve to slide relative to said grommet body extension in only said operative direction as said cam ramp flexes said retention member outboard of said retention sleeve, said ratchet means also acting as a latch means to maintain said grommet body stop portion and retention member in engagement with their respective opposed panel surfaces.

* * * * *